(12) United States Patent
Maeno

(10) Patent No.: US 6,443,685 B1
(45) Date of Patent: Sep. 3, 2002

(54) VEHICLE TOWING DEVICE

(75) Inventor: Mamoru Maeno, Hatsukaichi (JP)

(73) Assignee: Yuki Numazu (JP)

( * ) Notice: Subject to any disclaimer, the term of this patent is extended or adjusted under 35 U.S.C. 154(b) by 0 days.

(21) Appl. No.: 09/692,700

(22) Filed: Oct. 18, 2000

(51) Int. Cl.[7] .................................................. B60P 3/12
(52) U.S. Cl. ...................................... 414/563; 280/402
(58) Field of Search ........................... 414/563; 280/402

(56) References Cited

U.S. PATENT DOCUMENTS

| | | | | |
|---|---|---|---|---|
| 2,928,557 A | * | 3/1960 | Cline | ..................... 414/563 X |
| 3,951,280 A | * | 4/1976 | Peck | ........................... 414/563 |
| 4,383,807 A | * | 5/1983 | Bubik | ......................... 414/563 |
| 4,797,057 A | * | 1/1989 | Shoup et al. | ........... 280/402 X |
| 5,816,765 A | | 10/1998 | Pijanowski | |
| 5,984,614 A | * | 11/1999 | Weber | ..................... 414/563 X |

FOREIGN PATENT DOCUMENTS

JP          63184534          7/1988

* cited by examiner

*Primary Examiner*—Steven A. Bratlie
(74) *Attorney, Agent, or Firm*—Trojan Law Offices

(57) ABSTRACT

A towing device for a tow truck that employs a contact beam with or without a rotatable bracket so that the tow truck does not have to move to make adjustments when towing a vehicle.

14 Claims, 5 Drawing Sheets

VEHICLE TOWING DEVICE

This patent application claims priority to Japanese Patent Application 11-295515 filed on Oct. 18, 1999.

BACKGROUND OF THE INVENTION

1. Field of the Invention

A towing device that employs a contact beam and a rotating bracket that allows for adjustment of the vehicle towing device without having to move the entire tow truck for pulling, raising, lowering, and towing of a vehicle.

2. Description of Related Art

Most towing devices on tow trucks use hooks and wires on a winch to raise a vehicle or a wrecked car, which had run off the road, with a pulley on the front part of a beam of the vehicle towing mechanism. Normally, when a wrecked car was directly behind and properly positioned behind a tow truck, the vehicle towing mechanism could pick up and tow the wrecked car.

However, when an accident required "horizontal pulling" or pulling from the side of the tow truck towards the tow truck, normal tow trucks encountered problems. When a wrecked car was pulled horizontally, the tow truck had to be moved to align it with the position of the wrecked car because the towing mechanism on most tow trucks did not allow for adjustment of the towing mechanism without moving the entire truck.

Additionally, when there were obstacles such as trees, buildings, and even other vehicles around the vehicle, the tow truck had to be very careful in making any slight adjustments so that the obstacles were not damaged in any way when the wrecked car was pulled horizontally. Finally, as the wrecked car was being moved and lifted, the tow truck had to be repositioned and moved.

As a result, the tow truck itself had to be moved slightly over and over again more than once in order to lift up a single wrecked car, which made for extremely poor operability. The present invention was originated taking these problems into consideration and provides a vehicle towing device for a tow truck which does not require slight movements when pulling a wrecked car horizontally and lifting it.

From the preceding descriptions, it is apparent that the devices currently being used have significant disadvantages. Thus important aspects of the technology used in the field of invention remain amenable to useful refinement.

SUMMARY OF THE INVENTION

It is an object of the present invention to provide a vehicle towing device that will allow a tow truck to make adjustment before and during the lifting and towing of a vehicle without having to move or to reposition the tow truck. This vehicle towing device employs a power source such as a hydraulic cylinder to engage a telescoping beam that comprises a first beam and an extendable second beam to allow for easy adjustment, such as raising, lowering, extending, and collapsing of the towing mechanism without having to move the truck for the lifting, pulling, lowering or towing of a vehicle. In addition, this invention allows for a rotating bracket that has a pulley that further allows for the pulling, lifting or towing of a vehicle that is at an angle or that is not directly behind the tow truck.

The present invention introduces such refinement. In its preferred embodiments, the present invention has several aspects or facets that can be used independently, although they are preferably employed together to optimize their benefits. All of the foregoing operational principles and advantages of the present invention will be more fully appreciated upon consideration of the following detailed description, with reference to the appended drawings.

DESCRIPTION OF THE PREFERRED EMBODIMENTS

Figure 1:
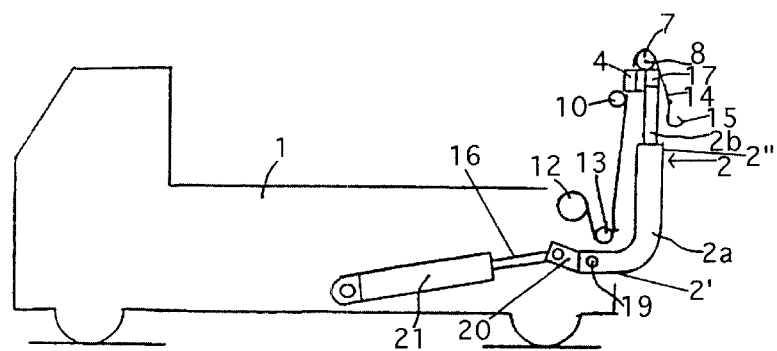
FIG. 1 is a side view of the present invention when the telescopic beam of the vehicle towing device is in a vertical position.

In FIGS. 1–9, a towing device for a tow truck has a telescopic beam 2, which turns upward from the rear of the tow truck along a vertical center line surface M—M from the top to the bottom of the tow truck. This telescopic beam 2 is shaped like an upside-down letter "V" and comprises a first beam 2a and an adjustable second beam 2b. The first beam 2a is supported on an axis 19 of tow truck body 1 so that the second beam 2b can be expanded at the same time. The second beam 2b can expand and adjust using a cylinder (not shown in drawing). In relation to the tow truck, the telescopic beam 2 also has a proximal end 2' and a distal end 2". Contact beam 17, which is substantially perpendicular to the telescopic beam 2 and is affixed and attached to the distal end 2", can be placed under a vehicle to permit said vehicle to be towed by operation of said towing device. Also, the contact beam 17 can be used for mounting the front wheel of the vehicle. A support 3 is removably affixed and connected to the contact beam 17 with a bolt 18. This support 3 can also be directly and removably affixed to the distal end 2" of the telescopic beam.

A power source, such as a hydraulic cylinder 21 with an adjustable rod 16, is secured to the tow truck body 1. This power source 21 engages the telescopic beam 2 to permit said telescopic beam 2 to be raised and lowered and to permit said telescopic beam 2 to be extended and collapsed. This hydraulic cylinder 21 raises and lifts the telescopic beam 2 by pulling the arm piece 20, which is connected at axis 19, and the hydraulic cylinder 21 is joined to the arm piece 20. Further, the center line Q—Q on the support 3 is positioned approximately perpendicular to the vertical center surface M—M.

A rotatable bracket 6 overhangs the rear of the tow truck body 1 and is placed on the rear end of a wire guide, such as a hollow cylinder 4, which is attached to support 3, such that the bracket 6 can rotate. The support 3 is attached to and provides support for the rotatable bracket 6, which also holds a main pulley 7. The main pulley 7 is attached to rotatable bracket 6 using an axis pin 8, which creates a "swing hook" pulley. Tangential line S—S on main pulley 7, which is parallel with center line Q—Q on hollow cylinder 4, is positioned so that it passes through an interior wall 5 of the wire guide or the hollow cylinder 4.

When removably affixed to the contact beam 17, the support 3 can have the rotatable bracket 6, which can also have a pulley 7 or a guide member 9, to allow the towing device to operate the towing wire, which is connected to an attachment device for securing a vehicle to be towed at an angle in relation to the vehicle. The support may also have a wire guide such as a hollow cylinder 4 to further lead the towing wire for securing the vehicle for towing. Also, the wire guide 4 can also have its own pulley 10 to further held lead the towing wire for securing the vehicle for towing.

The guide member 9, which is frame-like and shaped like a box with the left-hand side removed, clamps main pulley 7 and is also attached to the rotatable bracket 6 with axis pin 8. This guide member 9 further helps lead the towing wire in the operation of the towing vehicle. An auxiliary pulley 10, which is used for positioning for support 3, is placed on the front side of the hollow cylinder 4. A tangential line T—T on the auxiliary pulley 10 which is parallel with center line Q—Q on hollow cylinder 4 is configured so that it passes through interior wall 5 of hollow cylinder 4.

Figure 5:
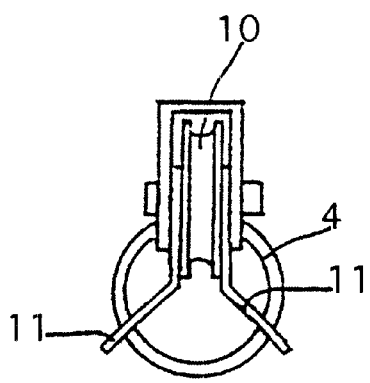
FIG. 5 is a view of the auxiliary pulley in FIG. 4.

In FIG. 5, another guide member 11, which widens at the bottom of the guide member 11 and clamps center line Q—Q of hollow cylinder 4, is located on the left and right hand sides of auxiliary pulley 10, and the guide member 11 is fixed to support 3. A tow wire 14, which protrudes from winch 12 on tow truck body 1, works through and connects via the intermediate pulley 13 on the side of the tow truck body 1, the auxiliary pulley 10 on the front end of the telescopic beam 2, the interior wall 5 of the hollow cylinder 4, and the main pulley 7 to an attachment device for securing said vehicle to be towed, such as a hook 15.

The rotatable bracket 6, pulley 7, wire guide, and guide members 9 and 11 all allow said towing device to operate a towing wire 14, which is connected to an attachment device, such as a hook 15 or a band piece 22, for securing a vehicle to be towed at an angle in relation to said vehicle.

Due to the flexibility of the removable contact beam and the support, the support can be removably affixed or attached to the distal end 2" of the telescopic beam 2. As described above, said support would also allow for a rotatable bracket, multitude of pulleys, wire guides, and guide members to further allow the towing device to operate.

Figure 6:
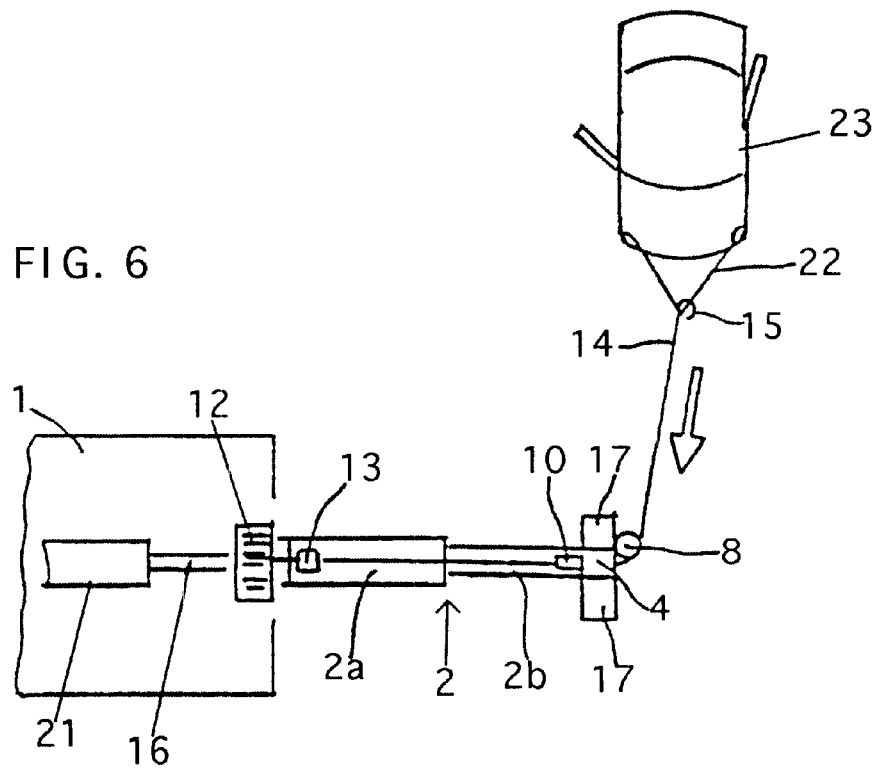
FIG. 6 is an overhead view of horizontal pulling for the present invention.

FIG. 6 shows a method of using this vehicle towing device for a tow truck in horizontally pulling and lifting a wrecked car, which has run off the road. The tow truck stops and positions alongside the vehicle 23 to be moved, such as a wrecked car. The power source or hydraulic cylinder 21 is activated to engage a telescopic beam to be raised, lowered, expanded or collapsed. Then, the rotating bracket 6 is adjusted to optimally adjust the vehicle towing device for towing said vehicle 23 at an angle in relation to said vehicle. Also, a towing wire is connected from the tow truck to an attachment device for securing the vehicle 23 to be towed to the towing device, such as band piece 22.

Figure 2:
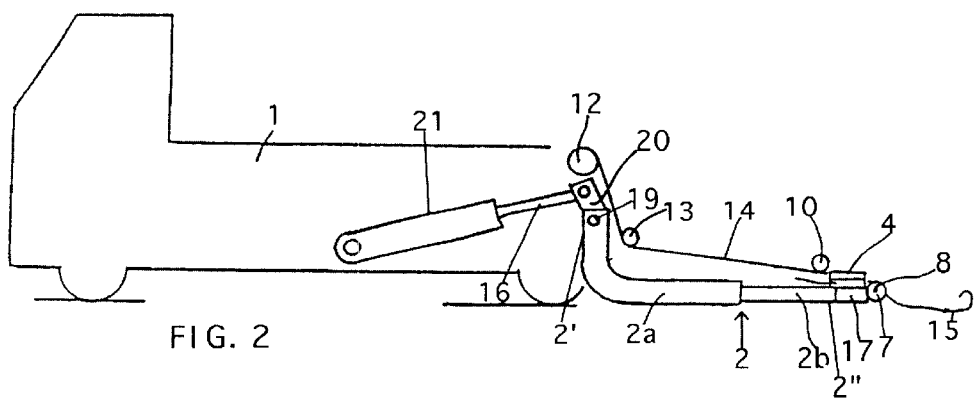
FIG. 2 is a side view of the vehicle towing device of FIG. 1 when the telescopic beam is in a horizontal position.
Figure 3:
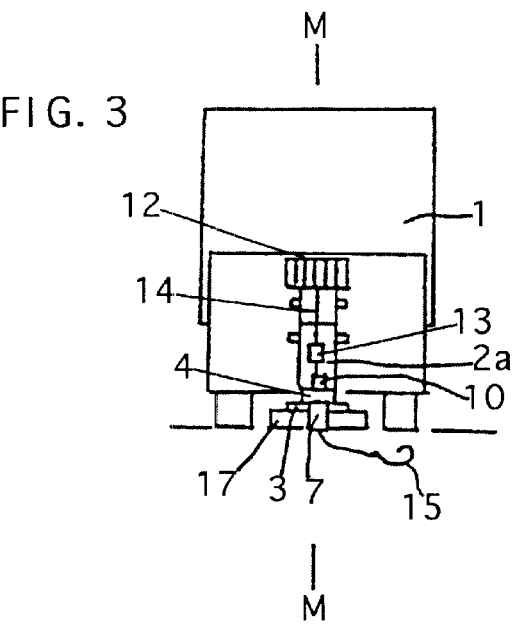
FIG. 3 is a rear view of the invention of FIG. 2.
Figure 4:
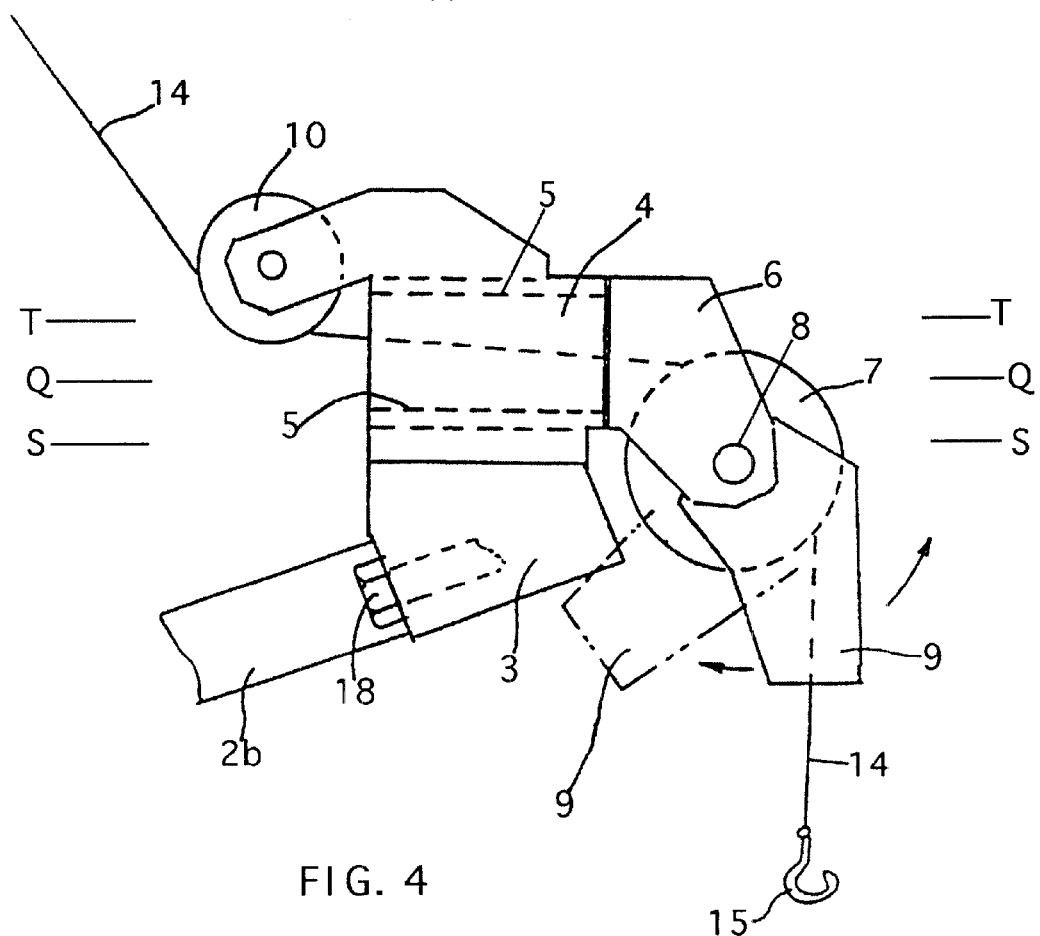
FIG. 4 is an enlarged side view of the invention at the distal end of the telescoping beam.

Thus, the hydraulic cylinder 21 is driven and the rod 16 is drawn; arm piece 20 and telescopic beam 2 are rotated to achieve the proper position to tow said vehicle. FIGS. 1–2 also shows the flexibility of this invention for allowing use of the contact beam 17 with the rotating bracket 6 and the associated pulleys 10 and 7.

When the horizontal position of the main pulley 7 is unsuitable for lifting a wrecked car (for example, when there are trees and buildings and other obstacles between main pulley 7 and the wrecked car), the second beam 2b of the telescopic beam 2 is adjusted, retracted, or extended so that the main pulley 7 is in a better or optimal position for lifting, pulling, lowering or towing. Horizontal pulling is simplified because the user no longer needs to move the tow truck itself, and to slightly move the second beam 2b of the telescopic beam 2 is much easier than moving a large tow truck even slightly.

The wire 14 on winch 12 is extended, and the hook 15 is hooked onto the wrecked car or the vehicle to be towed. The winch 12 is activated, and the wire 14 is hoisted. At this time, the rotatable bracket 6, having the main pulley 7, is attached to hollow cylinder 4 so that the rotatable bracket 6 and the attached main pulley 7 can be rotated to properly position the vehicle towing device toward the wrecked car. As a result, the wire 14, which has been hoisted, is wound around the drum of winch 12 and passes smoothly through the auxiliary pulley 10 and the intermediate pulley 13.

This vehicle towing device also provides the advantage of adjustment without moving the tow truck during actual lifting. When the wrecked car is being lifted, the position of main pulley 7 oftentimes changes. To compensate for this change, the power source is activated, and the second beam 2b of telescopic beam 2 is drawn or retracted to a more suitable position. Because the tow truck does not need to be moved, the operating efficiency of towing a vehicle is improved.

Figure 7:
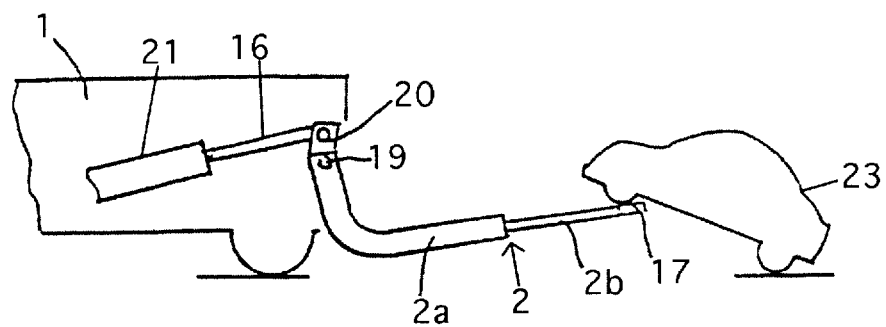
FIG. 7 is a side view of towing a vehicle using the contact bar of the present invention.
Figure 8:
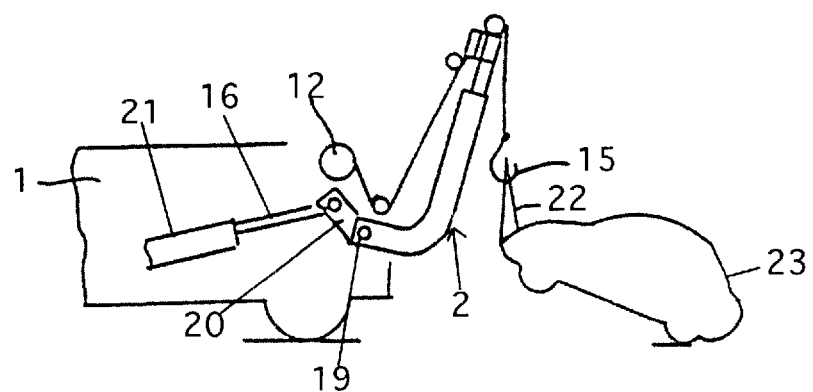
FIG. 8 is a side view of the a method of using the present invention with a band piece with a hook.

In FIG. 7, a vehicle can be transported by loading the front wheels of the vehicle onto the contact beam 17 and moving. In FIG. 8, in "quick and easy" hooking, a band piece 22, which is attached to the hook 15 on winch 12, is hooked onto the front part of the wrecked car so that pulling can be simplified by lifting up the front of the vehicle.

Besides simplifying the lifting and transport operation, the vehicle towing device in the present invention can also facilitate dropping, lifting and horizontal rolling operations for wrecked cars. Lifting and dropping operations involve lifting a vehicle out of a gully or ravine. For this type of situation, the main pulley 7 must be moved slightly in accordance with the position of the wrecked car. Due to the extension, retraction, or adjustment of the second beam 2b of the telescopic beam 2, the main pulley 7 can be moved easily and freely.

Figure 9A:
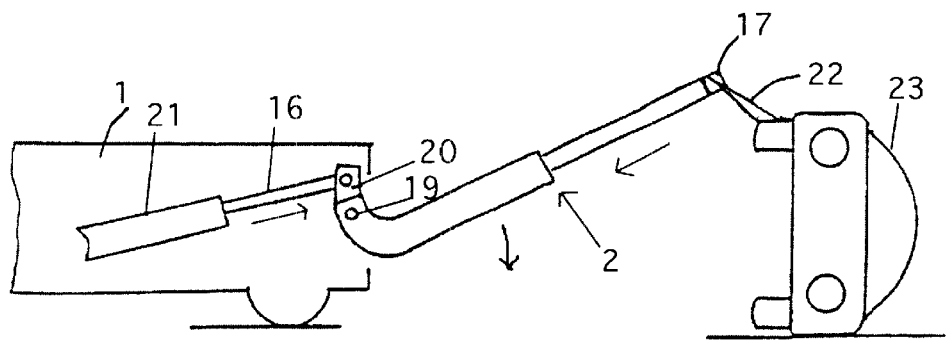
FIG. 9 is a side view of using the present invention to roll a turned over vehicle.
Figure 9B:
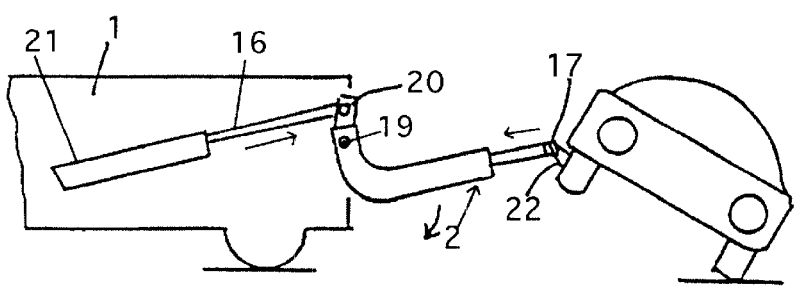
Figure 9C:
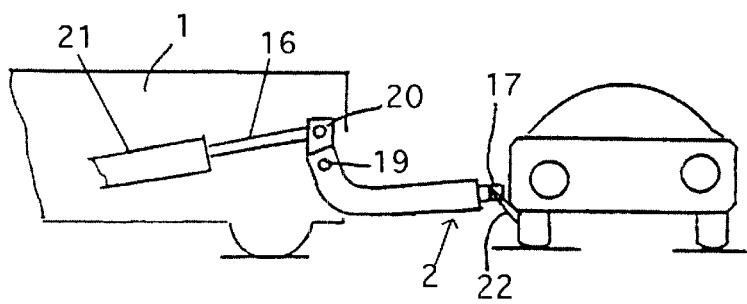

In FIG. 9, in rolling operations and to upright a vehicle that has rolled over to a ninety degree angle to its normal position, the support 3 is removed, and the telescopic beam 2 is placed at an incline. When the second beam 2b is extended, an attachment device for securing the vehicle to the contact beam, such as the band piece 22, can be attached to contact beam 17 and to the vehicle to permit said vehicle to be pulled, lowered, raised or towed by operation of said towing device. The front end of the band piece 22 is hooked onto the front wheel part and the rear wheel part on top of the wrecked car, which has rolled over (see FIG. 9(a)). Next, the second beam 2b is gradually retracted, and at the same time, the telescopic beam 2 is placed in a horizontal position, and the contact beam 17 is lowered while forming a circle (FIG. 9(b)). Thus, a vehicle, which has rolled over, can be slowly returned to its normal position without causing any large shocks when making contact with the ground (FIG. 9(c)).

The hydraulic cylinder 21 can be placed in a horizontal position by changing the position of axis 19 and the shape of the telescopic beam 2 and the arm piece 20. The telescopic beam 2 can also be lifted when the rod 16 of the hydraulic cylinder 21 is extended, as is indicated in FIG. 1, and can be lowered when the rod 16 of the hydraulic cylinder 21 is contracted, as indicated in FIG. 2.

This invention is very effective for several situations, In horizontal pulling operations, the vehicle and the position of main pulley 7 need to be moved. The present invention provides for adjustment of the position of main pulley 7 by using telescopic beam 2 without having to move the tow truck. By not having to move the tow truck, the operating effectiveness can be improved considerably.

The instant invention can be used as a regular front-wheel lifting-type of tow truck. The "quick and easy" operations make it possible to pull the front part of a wrecked car while it is hoisted in the air. Also, the position of main pulley 7 can be quickly and easily changed even while the wrecked car is being dropped, lowered, or lifted so that the tow truck does not have to be moved.

In rolling operations, this invention can be used to easily and safely turn an overturned car from its side (a ninety degree position with the ground) and back onto its wheels by (1) hooking band piece 22 to the contact beam 17 and to the vehicle and then (2) rotating and lowering the vehicle from its side back to its tires.

While the invention will be described in connection with preferred embodiments, it will be understood that it is not intended to limit the invention to those embodiments. On the contrary, it is intended to cover all alternatives, modifications, and equivalents as may be included within the spirit and scope of the invention as defined by the appended claims.

I claim:

1. A towing device for a tow truck comprising,
   a power source secured to said tow truck;
   said power source engaged to a telescopic beam to permit said telescopic beam to be raised and lowered and to permit said telescopic beam to be extended and collapsed;
   said telescopic beam having a distal end;
   said distal end having a contact beam affixed substantially perpendicular to said telescopic beam, whereby said contact beam is capable of being placed under a vehicle to permit said vehicle to be towed by operation of said towing device;
   a support removably secured to said contact beam;
   said support including a first wire guide;
   said first wire guide attached to a rotatable bracket, whereby said wire guide and said rotatable bracket help guide a towing wire, which is connected to an attachment device for securing a vehicle to be towed, at an angle in relation to said vehicle to be towed.

2. A towing device of claim 1 wherein said attachment device for securing the vehicle to the contact beam is attached to the contact beam and to the vehicle to permit said vehicle to be towed by operation of said towing device.

3. A towing device of claim 2 wherein said attachment device is a band piece.

4. A towing device of claim 1 wherein said power source is a hydraulic cylinder with an adjustable rod.

5. The towing device of claim 1 wherein said rotatable bracket has a pulley to further allow said towing device to operate said towing wire, which is connected to said attachment device for securing a vehicle to be towed, at said angle in relation to said vehicle.

6. The towing device of claim 1 wherein said support has a second wire guide to further lead the towing wire to the attachment device for securing said vehicle;
   said second wire guide has an auxiliary pulley to further lead the towing wire to the attachment device for securing said vehicle.

7. The towing device of claim 1 wherein the rotatable bracket further has a guide member, which further leads the towing wire in the operation of said towing device.

8. The towing device for a tow truck of claim 1 wherein the towing wire emanates from a winch on the tow truck through a pulley to said attachment device for securing said vehicle to be towed.

9. A towing device for a tow truck comprising,
   a power source secured to said tow truck;
   said power source engaging a telescopic beam to permit said telescopic beam to be raised and lowered and to permit said telescopic beam to be extended and collapsed;
   said telescopic beam having a distal end;
   said distal end having a removable support; and
   said support having a wire guide, said wire guide having a rotatable bracket to allow said towing device to operate a towing wire, which is connected to an attachment device for securing a vehicle to be towed, at an angle in relation to said vehicle.

10. The towing device of claim 9 wherein said rotatable bracket has a pulley to further allow said towing device to operate said towing wire, which is connected to said attachment device for securing the vehicle to be towed at said angle in relation to said vehicle.

11. The towing device of claim 9 wherein said wire guide has an auxiliary pulley to further lead the towing wire to the attachment device for securing said vehicle.

12. The towing device of claim 9 wherein the rotatable bracket further has a guide member, which further leads the towing wire in the operation of said towing device.

13. The towing device for a tow truck of claim 9 wherein the towing wire emanates from a winch on the tow truck through a pulley to said attachment device for securing said vehicle to be towed.

14. A method of using a towing device for a tow truck, said tow truck comprising a power source secured to said tow truck;

said power source engaged to a telescopic beam to permit said telescopic beam to be raised and lowered and to permit said telescopic beam to be extended and collapsed;

said telescopic beam having a distal end;

said distal end having a contact beam affixed substantially perpendicular to said telescopic beam, whereby said contact beam is capable of being placed under a vehicle to permit said vehicle to be towed by operation of said towing device;

a support removably secured to said contact beam;

said support including a first wire guide;

said first wire guide attached to a rotatable bracket, whereby said wire guide and said rotatable bracket help guide a towing wire, which is connected to an attachment device for securing a vehicle to be towed, at an angle in relation to said vehicle to be towed, comprising the following steps:

positioning the tow truck alongside said vehicle to be towed;

activating said power source to engage said telescopic beam to be raised, lowered, expanded or collapsed;

adjusting said rotating bracket to optimally adjust the vehicle towing device for towing said vehicle at an angle in relation to said vehicle; and connecting said towing wire from the tow truck to said attachment device for securing the vehicle to be towed to the towing device.

* * * * *